United States Patent [19]

Manno

[11] Patent Number: 4,905,403

[45] Date of Patent: Mar. 6, 1990

[54] LOOP FASTENING METHOD AND DEVICE

[76] Inventor: Joseph T. Manno, Star Route, Kane, Pa. 16735

[21] Appl. No.: 324,816

[22] Filed: Mar. 17, 1989

Related U.S. Application Data

[60] Division of Ser. No. 136,538, Dec. 22, 1987, abandoned, which is a continuation of Ser. No. 916,237, Oct. 7, 1986, abandoned.

[51] Int. Cl.[4] .............................................. A01K 83/00
[52] U.S. Cl. .................................. 43/43.16; 43/44.83
[58] Field of Search ................ 43/43.16, 44.83, 44.85, 43/44.87, 44.4; 289/1.5

[56] References Cited

U.S. PATENT DOCUMENTS

| | | | |
|---|---|---|---|
| 103,645 | 5/1870 | Muscroft | 43/43.16 |
| 1,206,689 | 11/1916 | Foster | 43/44.85 |
| 2,750,704 | 6/1956 | Bemis | 43/43.16 |
| 2,847,220 | 8/1958 | Heffron | 43/44.83 |
| 2,926,454 | 3/1960 | Gottman | 43/44.83 |
| 3,604,143 | 9/1971 | Sauers | 43/44.83 |
| 4,232,470 | 11/1980 | Steffick | 43/43.16 |
| 4,581,839 | 4/1986 | Mattison | 43/43.16 |

FOREIGN PATENT DOCUMENTS

| | | | |
|---|---|---|---|
| 121921 | 4/1971 | Norway | 43/43.16 |
| 2100103 | 12/1982 | United Kingdom | 43/43.16 |

*Primary Examiner*—Kurt Rowan
*Attorney, Agent, or Firm*—Nixon & Vanderhye

[57] ABSTRACT

A structure, such as a fish hook, configured for attachment to a strand without a knot. The structure includes a first end forming a hook, a second end forming an eyelet, and an intermediate portion including an open loop. Alternatively, the structure may comprise a first end forming a hook, a second end forming an eyelet, and a middle shank portion with a closed loop adjacent the eylet. By looping the strand and passing it into association with the eyelet and loop or intermediate loops, a method of tying a strand to a device without knots (i.e., in a knotless manner) is practiced.

8 Claims, 1 Drawing Sheet

LOOP FASTENING METHOD AND DEVICE

This application is a division of application Ser. No. 07/136,538 filed Dec. 22, 1987 which is a continuation of application Ser. No. 06/916,237 filed Oct. 7, 1986 now both abandoned.

BACKGROUND AND SUMMARY OF THE INVENTION

IT has long been recognized that the knotting of strands to hooks is a delicate, time consuming procedure. Particularly with respect to the connection of fine fishing line to small fish hooks, it is difficult for large sections of the population to properly thread or tie the line to the hook. Older people, those who are disabled, and children especially have great difficulties accomplishing such a task.

Over the years, there have been various proposals for the formation of a hook structure that can be attached to a line or strand without tying a knot. See, for example, U.S. Pat. Nos. 1,333,101 and 3,604,143. The hook structures disclosed therein are relatively complex and, as a result, their proposed structures have not enjoyed substantial commercial success.

In U.S. Pat. No. 4,294,031, a fish hook structure is disclosed which provides a T-shaped projection means along the shank portion of the hook in combination with an eyelet which permits a strand to be secured thereto without a knot. While such a structure is imminently practical, it is somewhat costly to manufacture, and therefore does not represent a particularly satisfactory solution to the problem.

According to the present invention, an integral structure is provided for ready attachment to a strand, the structure characterized by simplicity of design and ease of manufacture. That is, although as useful as the structure in U.S. Pat. No. 4,294,031, it is simpler and easier to manufacture. The structure has applicability not only in the design of fishing hooks, but may also be incorporated into the design of spinners, plugs, and/or other types of fishing lures, and to other environments where a strand must be easily but securely attached to another component.

In one embodiment of the invention, the structure includes a first end forming a hook, a second end forming a substantially closed loop member, and a middle portion between the first and second ends which includes a double, open-ended loop configuration wherein a pair of open-ended loops are arranged side-by-side, with the open portions of the loops facing in opposite directions, and wherein there remains a substantially straight portion between the substantially closed loop member on the second end of the structure and the double, open-ended configuration. To securely fasten a strand to this structure, all that is required is that a loop of the strand material be slidably engaged over one of the two open-ended loops and pulled upwardly through the open end of the other loop, wrapped a number of times around the shank portion between the loop configuration and the substantially closed loop member on the second end, and thereafter drawn into the substantially closed loop member. It has been determined that this fastening arrangement is able to develop 100% of the line strength. In other words, the disclosed knotless configuration is as secure and strong, i.e., can withstand as much pulling tension, as a traditional knotted arrangement.

In a second embodiment, a single, open-ended loop structure is provided relatively closely adjacent the substantially closed loop member at the second end of the hook structure. A relatively short, straight portion extends angularly away from the main shank portion of the hook terminating in the substantially closed eyelet member at the second end of the hook. The relatively straight angular portion between the open and substantially closed loop and eyelet members need only extend a distance such that the strand may be wrapped around this portion a number of times. In fastening the stand to this structure, a strand is first formed into a closed loop. The loop, including a free end thereof, is thereafter wrapped several times about the angularly extending shank portion and drawn through, i.e., pulled into the substantially closed loop member. This arrangement provides for the same strong and secure attachment as in the first embodiment.

It is thus seen to be a primary object of this invention to provide a simple and effective integral structure, such as a fishing hook or other similar device for easy, knotless attachment to a strand, and a method of strand attachment. This and other objects of the invention will become clear from an inspection of the detailed description of the invention and from the appended claims.

DETAILED DESCRIPTION OF THE INVENTION

Figure 1:
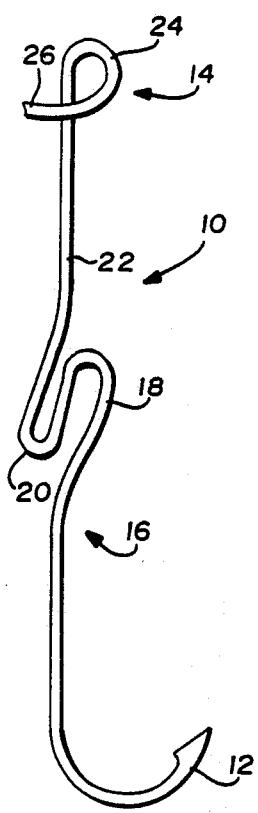
FIG. 1 is a side view of a first embodiment of an exemplary structure according to the present invention.

With reference to FIG. 1 there is shown a fishing hook structure 10 including a first end forming a hook 12, a second end 14 and a middle portion 16. The middle portion 16 includes a double open-ended loop structure comprising a first loop 18 which opens in a downward direction in side-by-side relationship with a second, open loop 20 which opens in the upward direction. Between this double loop configuration and the second end 14 of the hook structure, there is a substantially straight shank portion 22. The second end 14 of the structure includes a substantially closed loop member 24 which terminates at a free end 26 portion, which overlies the shank portion 22.

Figure 3:
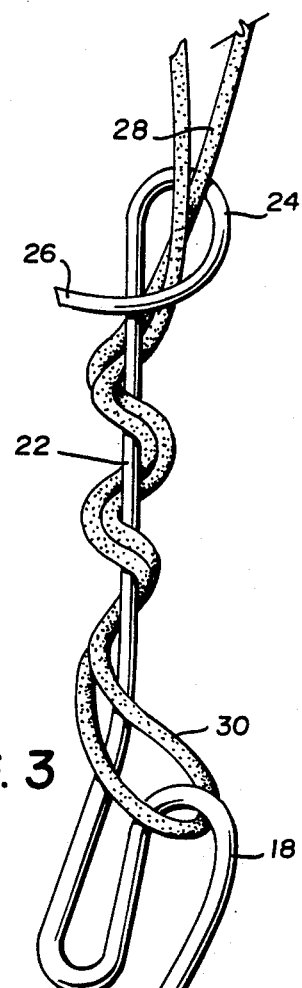
FIG. 3 is a partial perspective view of the structure of FIG. 1 shown connected to a strand.

With reference now to FIG. 3, there is illustrated how a strand 28 may be securely fastened to the hook structure illustrated in FIG. 1. The strand 28 is first doubled back on itself to form a substantially large loop portion, the closed end 30 of which is drawn over the loop 20 and upwardly into engagement with the loop 18. The doubled strand is then wrapped several times about the shank portion 22 and drawn through the substantially closed loop 24. The loop portion 24 serves as a strand containing means in the sense that it prevents the strand from unraveling.

Figure 2:
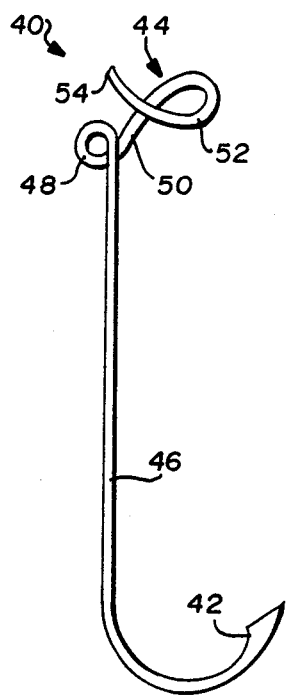
FIG. 2 is a side view of another alternative embodiment in accordance with the present invention.

Referring now to the alternative embodiment illustrated in FIG. 2, a fish hook 40 is disclosed which includes a first free end formed as a hook 42, a second end 44 and a substantially straight middle shank portion 46. Closely adjacent the second end 44, there is formed a single, substantially closed loop portion 48 which merges into a substantially straight shank portion 50 extending angularly away from the middle shank portion 46 and which, in turn, merges with a loop member 52 at the second end 44 and which terminates at a second free end 54 portion, which overlies shank portion 50.

Figure 4:
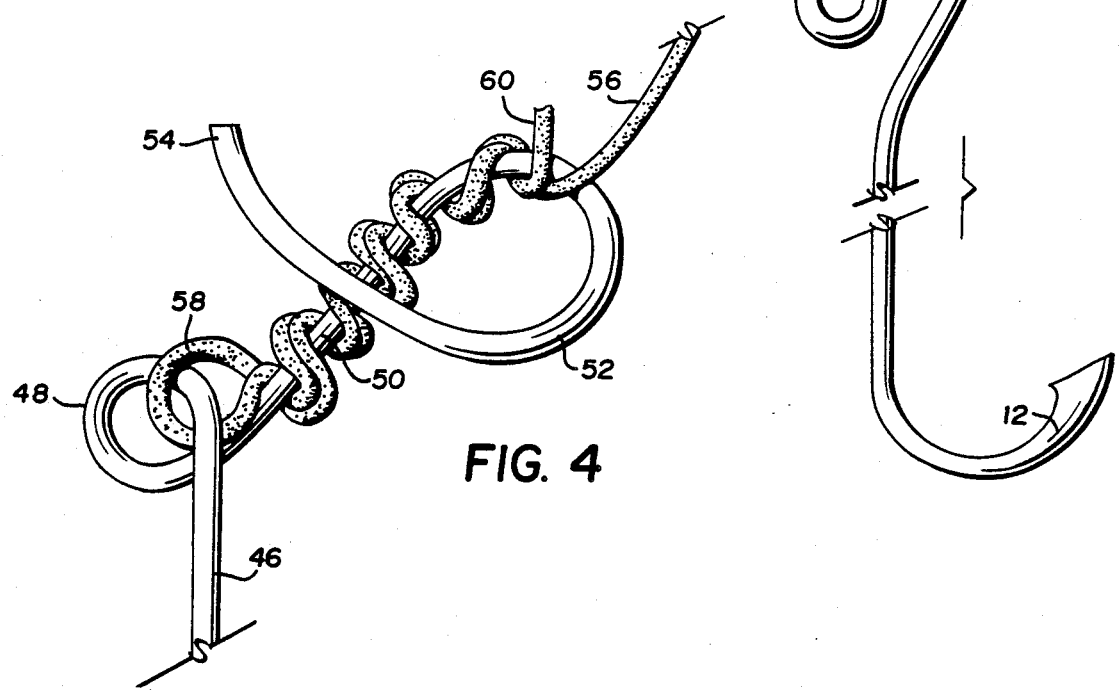
FIG. 4 is a partial perspective view of the second embodiment of the invention also shown connected to a strand.

The manner in which a strand is secured to the fish hook structure of FIG. 2 is described herein with particular reference to FIG. 4. A strand 56 is pulled into the single, closed loop configuration 48 and doubled back on itself to form a loop 58. The doubled strand is then wrapped several times around the angularly extending shank portion 50 and pulled up into the substantially closed loop member 52 which, as in the first embodiment, contains the strands and keeps them from unraveling. The strand loop may be of considerably smaller dimension than the first embodiment so that the free end 60 of the loop terminates along the shank portion 50 but is securely trapped under the wrapped strand.

Accordingly, the structures of these inventions—which may be incorporated in the design of fish hooks, and other devices such as spinners, lures, plugs and the like—are characterized by simplicity of design, and low cost manufacture. Manufacture is further facilitated by the fact that the structures are preferably formed from a single, continuous metal wire, and the various loop configurations are generally co-planar with the hook portions of the structures. Moreover, the simplified structural design permits the strands to be securely fixed to the structures without tedious threading and without the need for knots.

The above description of the use of the disclosed structures as fishing hooks is only exemplary, it being understood that the structures and the respective methods of fastening strands thereto may also be used in connection with other devices as previously described.

It will also be seen that according to the invention there is provided a method of affixing a strand (28, 56, e.g., fishing line) to a device (10, 40) having a first, working, end (12, 42, e.g., fish hook); a second end terminating in a first strand-retaining structure (24, 44); and a middle portion (16, 46) including a second strand-retaining structure (18, 20; 48) and a shank (22, 50) extending between the second strand-retaining structure and the first strand-retaining structure, comprising the following steps: (a) forming a loop with the strand so that the loop has a closed end portion (30, 58), and is doubled-over; (b) passing the closed loop portion into operative association with the second strand-retaining structure (18, 20; 48). Then, (c) wrapping the doubled-over strand multiple times around the shank (22, 50). And then, (d) passing the doubled-over strand from the shank into operative association with the first strand-retaining structure (24, 52), so that the strand is retained securely by the device without the necessity of tying a knot in the strand.

It will thus be seen that according to the present invention, simple yet effective integral structures are provided for ready and easy attachment to strands, which structures are easy to manufacture and use, and which can be utilized by large segments of the population. While the invention as herein been shown and described in what is presently conceived to be the most practical and preferred embodiment thereof, it will be apparent to those of ordinary skill in the art the many modifications may be made thereof which nevertheless remain within the scope of the invention, which scope is to be accorded the broadest interpretation of the appended claims so as to encompass all equivalent structures, devices, and methods.

What is claimed is:

1. A method of affixing a strand to a device having a first, working end; a second end terminating in a first strand-retaining structure; and a middle portion including a second strand-retaining structure and a shank extending between the second strand-retaining structure and the first strand-retaining structure, comprising the steps of:
   (a) forming a loop with the strand so that the loop has a closed end portion, and is doubled-over;
   (b) passing the closed loop portion into operative association with the second strand-retaining structure; then
   (c) wrapping the doubled-over strand multiple times around the shank; and then
   (d) passing the doubled-over strand from the shank into operative association with the first strand-retaining structure, so that the strand is retained securely by the device without the necessity of tying a knot in the strand, and without having to thread the strand through any apertures in said structure.

2. A method as recited in claim 1, wherein the working end of the device comprises a fish hook, and wherein the strand comprises fishing line.

3. A method as recited in claim 1, wherein the first strand-retaining structure comprises a substantially closed loop which is formed to permit said strand to be pulled therein without threading, and wherein step (d) is practiced by pulling the doubled-over strand into said substantially closed loop without threading.

4. A method as recited in claim 3, wherein the second strand-receiving structure comprises a second substantially closed loop, and wherein step (b) is practiced by pulling the strand into the second substantially closed loop without threading.

5. A method as recited in claim 3, wherein the second strand-receiving structure comprises a double open loop configuration, and wherein step (b) is practiced by passing the strand closed loop portion over one of said open double loops and into the other of said open double loops.

6. A method as recited in claim 1, wherein the second strand-receiving structure comprises a substantially closed loop, and wherein step (b) is practiced by passing the strand into operative association with the substantially closed loop without threading.

7. A method as recited in claim 1, wherein the second strand-receiving structure comprises a double open loop configuration, and wherein step (b) is practiced by passing the strand closed loop portion over one of said open double loops and into the other of said open double loops.

8. A method as recited in claim 2, wherein the first strand-retaining structure comprises a substantially closed loop, and wherein step (d) is practiced by pulling the doubled-over strand into said substantially closed loop without threading.

* * * * *